(12) United States Patent
Zhang et al.

(10) Patent No.: US 10,321,371 B2
(45) Date of Patent: Jun. 11, 2019

(54) METHOD AND APPARATUS FOR COMMUNICATION OVER NETWORK SLICES IN WIRELESS COMMUNICATION SYSTEMS

(71) Applicant: Telefonaktiebolaget LM Ericsson (publ), Stockholm (SE)

(72) Inventors: Shunliang Zhang, Beijing (CN); Xuejun Cai, Täby (SE); Jian Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 312 days.

(21) Appl. No.: 15/037,035

(22) PCT Filed: Apr. 11, 2016

(86) PCT No.: PCT/CN2016/078961
§ 371 (c)(1),
(2) Date: May 16, 2016

(87) PCT Pub. No.: WO2017/177364
PCT Pub. Date: Oct. 19, 2017

(65) Prior Publication Data
US 2018/0124660 A1 May 3, 2018

(51) Int. Cl.
*H04W 36/04* (2009.01)
*H04W 84/02* (2009.01)
(Continued)

(52) U.S. Cl.
CPC ....... *H04W 36/04* (2013.01); *H04W 36/0055* (2013.01); *H04W 36/22* (2013.01); *H04W 84/02* (2013.01)

(58) Field of Classification Search
CPC .............................. H04W 36/04; H04W 36/22
See application file for complete search history.

(56) References Cited

U.S. PATENT DOCUMENTS

2017/0070892 A1* 3/2017 Song ..................... H04W 16/18
2017/0079059 A1* 3/2017 Li ......................... H04W 16/02
(Continued)

FOREIGN PATENT DOCUMENTS

| CN | 101895896 A | 11/2010 |
|----|----|----|
| CN | 104602326 A | 5/2015 |
| WO | WO 2004/003751 A1 | 1/2004 |

OTHER PUBLICATIONS

International Search Report and Written Opinion of the ISA, Application No. PCT/CN2016/078961, dated Dec. 30, 2016, 11 pages.
(Continued)

*Primary Examiner* — Tejis Daya
(74) *Attorney, Agent, or Firm* — Sage Patent Group

(57) ABSTRACT

Embodiments of the present disclosure relates to communication over a network comprising network slices. According to one embodiment of the present disclosure, there provide a method performed by a network node. The method comprises: informing, in response to determination that user traffic of at least one user equipment needs to be redirected from a first network slice to a second network slice, a control plane function node supporting the first network slice of a redirecting user traffic request. Compared with the second network slice, a way of handling a control plane and/or user plane for communication services in the second network slice is different from that in the first network slice. In the other aspects of the present disclosure, there also provides methods for communication by a control plane function node and by a user equipment and corresponding apparatuses.

17 Claims, 7 Drawing Sheets

(51) Int. Cl.
*H04W 36/00* (2009.01)
*H04W 36/22* (2009.01)

(56) References Cited

U.S. PATENT DOCUMENTS

| 2017/0086118 | A1* | 3/2017 | Vrzic | H04W 36/26 |
| 2017/0164349 | A1* | 6/2017 | Zhu | H04W 28/0247 |
| 2017/0289791 | A1* | 10/2017 | Yoo | H04W 76/11 |
| 2018/0317148 | A1* | 11/2018 | Jin | H04W 36/08 |
| 2018/0324645 | A1* | 11/2018 | Park | H04W 36/0016 |
| 2018/0324663 | A1* | 11/2018 | Park | H04W 36/08 |

OTHER PUBLICATIONS

NTT DOCOMO, "Solution to Support a UE With Simultaneous Connections to Multiple Network Slices," SA-WG2 Temporary Document (S2-161191), SA WG2 Meeting #113 AH, Feb. 23-26, 2016, Sophia Antipolis, France, pp. 1 and 4, figure 1.

3GPP, Technical Report—"3rd Generation Partnership Project; Technical Specification Group Services and System Aspects; Architecture Enhancements for Dedicated Core Networks; Stage 2 (Release 13)", 3GPP TR 23.707 V13.0.0 (Dec. 2014), 39 pp.

3GPP, Technical Report—"3rd Generation Partnership Project; Technical Specification Group Services and System Aspects; Enhancements of Dedicated Core Networks selection mechanism; (Release 14)", 3GPP TR 23.711 V0.2.0 (Nov. 2015), 20 pp.

3GPP, Technical Specification—"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.5.0 (Dec. 2015), 337 pp.

NGMN Alliance, "NGMN 5G White Paper", Version 1.0, Feb. 17, 2015, 125 pp.

* cited by examiner

METHOD AND APPARATUS FOR COMMUNICATION OVER NETWORK SLICES IN WIRELESS COMMUNICATION SYSTEMS

CROSS REFERENCE TO RELATED APPLICATION

This application is a 35 U.S.C. § 371 national stage application of PCT International Application No. PCT/CN2016/078961, filed on Apr. 11, 2016, the disclosure and content of which is incorporated by reference herein in its entirety.

TECHNICAL FIELD

The present disclosure generally relates to communication in a wireless communication system, particularly to methods and apparatuses for communication over network slices in a wireless communication system.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Diverse applications or services are supposed to be provided by the next generation mobile networks, such as the $5^{th}$ Generation (5G) networks. It is expected that 5G networks will support emerging use cases with a high variety of applications and variability of their performance attributes, from delay-sensitive video applications to ultra-low latency, from high speed entertainment applications in a vehicle to mobility on demand for connected objects, and from best effort applications to reliable and ultra-reliable ones such as health and safety. Furthermore, diverse use cases will be delivered across a wide range of devices (e.g., smartphones, wearable devices, vehicle-mounted devices, Machine-Type Communications (MTC)) and across a fully heterogeneous environment.

Different use cases may put different requirements to future networks. For example, acceptable interruption time, reliability and availability, acceptable latency, data rate, as well as cost per user. It would be quite difficult or cost impossible to deploy a common network to fulfill such extremely diverse requirements. To resolve the problem, the concept of network slices is proposed to fulfill diverse requirements from various use cases. A network slice may support the communication services of a particular connection type with a specific way of handling control plane and user plane for the services. It is expected that there would be many different type of network slices for different usage in the networks. At same time, from practical business perspective, due to resource restriction or business limitation, it is possible that certain type of network slice is not available in certain area or at certain time while it may be available in another area or another time. In different area or different operators, different network slice services may be provided.

Therefore, there is a need to provide solutions for redistributing user traffic between network slices.

SUMMARY

One or more method and apparatus embodiments according to the present disclosure aim to provide one or more solutions for user traffic redistribution between different network slices. Other features and advantages of embodiments of the present disclosure will also be understood from the following description of specific embodiments when read in conjunction with the accompanying drawings, which illustrate the principles of embodiments of the present disclosure.

According to the first aspect of the present disclosure, there is provided a method performed by a network node. The method comprises: informing, in response to determination that user traffic of at least one user equipment needs to be redirected from a first network slice to a second network slice, a control plane function node supporting the first network slice of a redirecting user traffic request, wherein a way of handling a control plane and/or user plane for communication services in the second network slice is different from that in the first network slice.

According to the second aspect of the present disclosure, there is provided a method performed by a control plane function node, which supports at least a first network slice. The method comprises: obtaining a redirecting user traffic request indicating that traffic of at least one user equipment needs to be redirected from the first network slice to a second network slice; initiating a network slice handover process for the at least one user equipment, wherein a way of handling a control plane and/or user plane for communication services in the second network slice is different from that in the first network slice.

According to the third aspect of the present disclosure, there is provided a method performed by user equipment. The method comprises: obtaining a network slice handover request message indicating a network slice handover from a first network slice to a second network slice; redirecting user traffic from the first network slice to the second network slice, wherein a way of handling a control plane and/or user plane for communication services in the second network slice is different from that in the first network slice.

According to the fourth aspect of the present disclosure, there is provided a network node in a network comprising a plurality of network slices. The network node comprises: an informing unit configured to inform, in response to determination that user traffic of at least one user equipment needs to be redirected from a first network slice to a second network slice, a control plane function node supporting the first network slice of a redirecting user traffic request, wherein a way of handling a control plane and/or user plane for communication services in the second network slice is different from that in the first network slice.

According to the fifth aspect of the present disclosure, there is provided a control plane function node in a network comprising a plurality of network slices. The control plane function node supports at least a first network slice. The control plane function node comprises: an obtaining unit configured to obtain a redirecting user traffic request indicating that traffic of at least one user equipment needs to be redirected from the first network slice to a second network slice; a network slice handover unit configured to initiate a network slice handover process for the at least one user equipment, wherein a way of handling a control plane and/or user plane for communication services in the second network slice is different from that in the first network slice.

According to the sixth aspect of the present disclosure, there is provided user equipment in a network comprising a plurality of network slices. The user equipment comprises: an obtaining unit configured to obtain a network slice handover request message indicating a network slice handover from a first network slice to a second network slice; a traffic redirecting unit configured to redirect user traffic from the first network slice to the second network slice, wherein a way of handling a control plane and/or user plane for communication services in the second network slice is different from that in the first network slice.

According to the seventh aspect of the present disclosure, there is provided a network node in a network comprising a plurality of network slices. The network node comprises processing means adapted to: cause to inform, in response to determination that user traffic of at least one user equipment needs to be redirected from a first network slice to a second network slice, a control plane function node supporting the first network slice of a redirecting user traffic request, wherein a way of handling a control plane and/or user plane for communication services in the second network slice is different from that in the first network slice.

According to the eighth aspect of the present disclosure, there is provided a control plane function node in a network comprising a plurality of network slices. The control plane function node comprises processing means adapted to: cause to obtain a redirecting user traffic request indicating that traffic of at least one user equipment needs to be redirected from a first network slice to a second network slice; cause to initiate a network slice handover process for the at least one user equipment, wherein a way of handling a control plane and/or user plane for communication services in the second network slice is different from that in the first network slice.

According to the eighth aspect of the present disclosure, there is provided user equipment in a network comprising a plurality of network slices. The user equipment comprises processing means adapted to: cause to obtain a network slice handover request message indicating a network slice handover from a first network slice to a second network slice; cause to redirect user traffic from the first network slice to the second network slice, wherein a way of handling a control plane and/or user plane for communication services in the second network slice is different from that in the first network slice.

The various embodiments of the present disclosure provide solutions for redistribution of user traffic between different network slices in a flexible and dynamic way, while reducing service interruption time to UE so as to ensure user experience during the redirection process.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of 5G cellular communication system for illustrative purposes, those skilled in the art will recognize that one or more embodiments of the present disclosure can also be applied to various other types of cellular communication systems. Thus, the following aspects, features, embodiments and advantages are only for illustrative purposes, and should not be understood as elements or limitations of the appended claims, unless otherwise explicitly specified in the claims.

A user equipment (UE) may comprise, be implemented as, or known as an access terminal, a subscriber station, a subscriber unit, a mobile station, a remote station, a remote terminal, a user terminal, a user agent, a user device, a user station, or some other terminology.

In some implementations a user equipment may comprise a cellular telephone, a cordless telephone, a Session Initiation Protocol (SIP) phone, a personal digital assistant (PDA), a handheld device having wireless connection capability, a Station (STA), wearable devices, vehicle-mounted devices, Internet of Things (IoT) devices, machine-type communication (MTC) devices or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, wearable devices, vehicle-mounted devices, IoT devices, MTC devices or any other suitable device that is configured to communicate via a wireless or wired medium.

As discussed above, in order to fulfill diverse requirements from various use cases in future networks (such as 5G networks), network slices may be used to support various communication services of different connection types, different service demands and/or different performance requirements.

Figure 1:
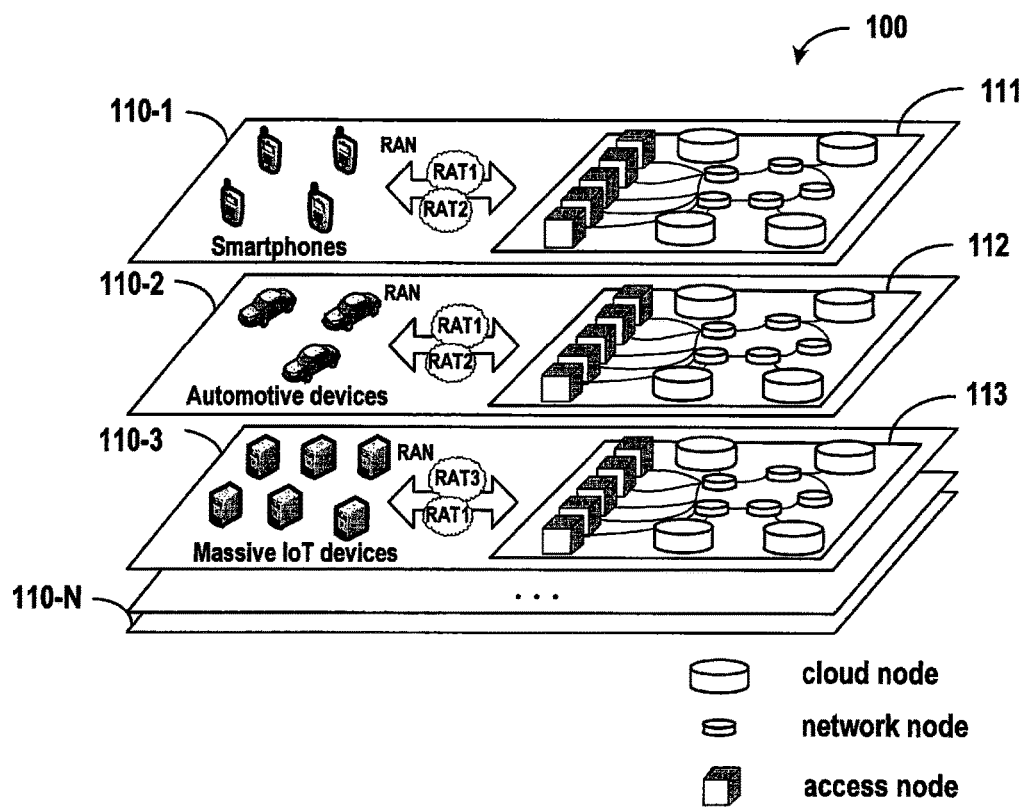
FIG. 1 schematically illustrates a network architecture 100 with network slices instantiated, in which various embodiments of the present disclosure may be implemented.

FIG. 1 schematically illustrates an example network architecture 100 with network slices instantiated, in which various embodiments of the present disclosure may be implemented.

As shown in FIG. 1, the network architecture 100 includes a radio access network (RAN) and a core network associated with the RAN. A user equipment can access the RAN and thereby be served by a selected one of the network slices 110-1, 110-2, 110-3, . . . , 110-N of the core network. The term "associated" used herein for "the core network associated with the RAN" means that the RAN and the core network can collaborate to provide services to a user equipment under coverage of the RAN, and the user equipment can establish a connection with a network slice of the core network via the RAN. The core network and the RAN may or may not be operated by the same network operator.

The network comprises a plurality of network slices 110-1, 110-2, 110-3 . . . , 110-N, which may support different communication services. Each of network slices 110-1, 110-2, 110-3 . . . , 110-N could be composed by a collection of 5G network functions and possibly specific Radio Access Technology (RAT) with specific settings that are combined together for the specific use case or business model. Thus, each of the network slices may span all domains of the network: software modules running on cloud nodes, specific configurations of the transport network supporting flexible location of functions, a dedicated radio configuration or even a specific RAT, as well as configuration of a 5G device. It should be noted that not all network slices contain the same network functions, and some functions that today seem essential for a mobile network might even be missing in some of the slices. In this example, the network slice 110-1 is instantiated to support voice and packet communications among smartphones, while the network slice 110-2 is instantiated to support communications toward automotive devices; and so on. Therefore, it is possible that each of the network slices 110-1, 110-2, 110-3 . . . , 110-N only contains those network functions that are necessary and/or suitable to support its respective network/communication services. A specific network service may be instantiated according to dynamic requirements from third party users and/or the business agreement between network service providers and network service consumers.

Each of the network slices 110-1, 110-2, 110-3 . . . , 110-N may comprise its own network elements or functions, like control plane function (such as Mobility Management Entity (MME) and Policy and Charging Rules Function (PCRF)) and/or user plane function (such as service provider gateway (GW)). As shown in FIG. 1, the network slices 110-1, 110-2, 110-3 may employ its own core networks 111, 112, 113 respectively. Some of the network slices may share the same infrastructure of Radio Access Network (RAN) and/or Core Network (CN). It should be understood that although the core networks 111, 112, 113 are shown in separate blocks denoted with different reference numerals for the purpose of clear illustration, they may be based on the same or different network infrastructure, such as access nodes, network nodes, cloud nodes. There may be some access nodes, network nodes and/or cloud nodes in the core network infrastructure deployed to only serve communication services of a particular network slice. In contrast, some access nodes, network nodes and/or cloud nodes of the infrastructure may be used to realize the network functions of two or more network slices. Those nodes serving multiple network slices may maintain the configurations or settings for respective network slices such that different communication services supported by respective network slices can be differentiated from one another in terms of virtual network functions. In fact, a network slice may support the communication services of a particular connection type (s) with a specific way of handling control plane and user plane for the services.

It should be noted that network slices can be instantiated in a cloud-based telecommunication network, which provides cloud-based services by on one or more virtual network elements. This virtualization of the hardware may be referred to as network function virtualization (NFV). Thus, NFV may be used to consolidate many network equipment types onto industry standard high volume server hardware, physical switches, and physical storage, which could be located in for example data centers and Customer Premise Equipment (CPE). The NFV technology will make it more flexible and efficient to provide and operate the virtual mobile network service, as well as value added service with low cost and reduced time to market.

It would be advantageous that a specific network slice can be dynamically instantiated/terminated or scaled out/in to support dynamic and flexible business model and efficient resource utilization, especially in cloud network environment. For example, in case a new network slice customized for a specific type of service/application is instantiated and the existing network slice has to be torn down, if the ongoing user traffic on the default slice is not redirected to the customized slice, then user experience and network resource utilization efficiency cannot be improved in time and merit of the new dedicated network slice would not be fully used. On the other hand, if the dedicated network slice is preserved and instantiated at early time since the first user, while the number of users increases in slow pace, then it would be a waste of resource and a challenge for network operators to make ends meet from practical business perspective. As another example, in case the size of a user group to an existing dedicated network slice is decreasing to certain small scale, this active dedicated network slice customized for a specific type of service/application may need to be terminated because the economy of scale is lost. And if the ongoing user traffic on the dedicated slice is not redirected to another slice (such as a default slice) while the dedicated slice is torn down, then user experience will be seriously impacted. On the other hand, if the dedicated slice is maintained until the last user left while the size of the user group decreased rather slowly, then it would be questionable for network operator to make revenue from the network slice business.

Therefore, there is a need for the network to provide mechanism to redirect ongoing user traffic into the new network slice that is customized for the specific type of service/application during dynamic network slice instantiation and/or redirect the remaining user traffic off the dedicated network slice before a dedicated network slice is terminated. In addition, user experience needs to be ensured as much as possible during the traffic redirection procedure. Various embodiments of the present disclosure aim to provide solutions for redistribution user traffic among different network slices.

Figure 2:
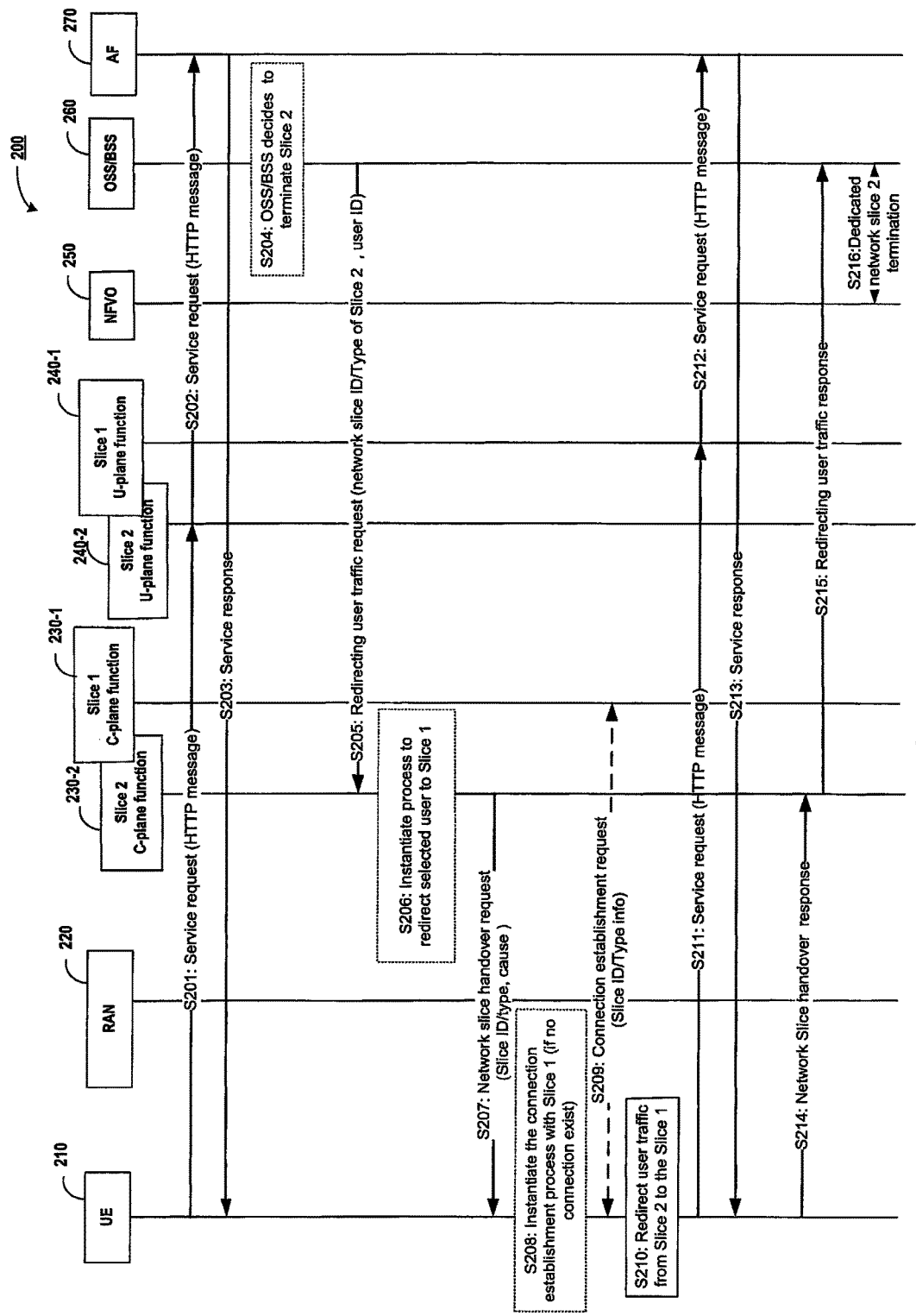
FIG. 2 is a flow diagram schematically illustrating a process 200 of redistribution of traffic between different network slices according to one embodiment of the present disclosure.

FIG. 2 is an interactive message flow diagram schematically illustrating a process 200 of redistribution of traffic between different network slices according to one embodiment of the present disclosure where traffic in a dedicated network slice is redirected to a default network slice.

The example process 200 of FIG. 2 may be performed based on a communication network, which includes a radio access network (as denoted by numeral reference 220) and a cloud-based core network. The network can be sliced into different network slices by a NFV node (for example, Network Functions Virtualization Orchestrator (NFVO), as denoted by numeral reference 250) to support various types of communication services/applications.

Assume a UE 210 is originally served for a particular service by a network slice 2, which may be a dedicated network slice in the network. Through the bearers over the network slice 2, the UE 210 may send, in step S201, an application layer service request such as a Hyper Text Transport Protocol (HTTP) request to require certain information from the application server or report certain information to the application server, like tactile internet application server hosting the application functions. The service request message is received and processed by a user plane function node of the network slice 2 (as denoted by numeral reference 240-2), which then forwards, in step S202, the service request message to a relevant application function (AF) node 270. In step S203, the AF 270 replies the UE 210 with an application layer response message to provide required service.

According to the example embodiment of FIG. 2, Operation Support System and/or Business Support System (OSS/BSS) 260 of the operator may be enhanced to determine whether a network slice is to be instantiated or terminated. Since a great amount of user information (e.g., user traffic information, user requirement or behavior information) as well as operator strategy is naturally available for the OSS/BSS system, the OSS/BSS 260 may make the determination based on big data analysis of that information.

As shown in FIG. 2, through big data analysis on, for example, user traffic, user behaviors/requirements, business strategy of the operator on dedicated network slice service, and/or requirements from application service providers, the OSS/BSS 260 may decide, in step S204, to terminate the dedicated network slice 2. For example, the network slice 2 is currently serving for a decreasing special user requirement. Once the user requirement is not significant anymore e.g., the special user requirement (may be represented by user group size, or traffic volume, etc.) below certain threshold, the OSS/BSS 260 can make the decision to terminate the dedicated network slice 2.

Before the dedicated network slice 2 is terminated, the OSS/BSS 260 needs to inform the dedicated network slice 2 to redirect specific user traffic to a designated network slice, such as a default network slice 1, so that the network slice handover makes no effects to the user traffic of the UE 210. In step S205, the OSS/BSS 260 sends a redirecting user traffic request message to a control plane function node 230-2 of the network slice 2, which may be a Mobility Management Entity (MME) or a Policy and Charging Rules Function (PCRF) node that serves network slice 2. The redirecting user traffic request message may include information that is necessary to perform the traffic redirection between the dedicated network slice 2 and the default network slice 1. As an example, the redirecting user traffic request may include, but not limited to, at least one of following items:

user identification information of the at least user equipment;
information related to the default network slice 1, such as slice ID and/or slice type;
descriptive information of the traffic to be redirected, such as traffic type, cause of the redirection.

Based on the redirecting user traffic request message from the OSS/BSS 260, the control plane function node 230-2 of the network slice 2 may optionally perform, in step S206, a dedicated process to handle the user traffic redirection between the network slice 2 and the network slice 1. In step S207, the control plane function node 230-2 of the network slice 2 sends a network slice handover request message to the UE 210 that is identified in the redirecting user traffic request sent by the OSS/BSS 260. It should be appreciated that one or more UEs may be involved in the network slice handover procedure, although FIG. 2 only shows one UE 210 for the purpose of illustration. The network slice handover request message may include, but not limited to:

information related to the network slice 1, e.g., the network slice type and/or network slice ID of the target network slice 1;
Descriptive information of the traffic to be redirected, e.g., the type of the traffic, cause of the redirection.

It should be noted depending upon the architecture of the network, in the case of the PCRF is the interaction function with the OSS/BSS 260, the PCRF as the control plane function rather than the MME itself may trigger the user traffic redirection process through the MME.

Upon receiving the network slice handover request message from network side, the UE 210 may decide if the request can be accepted or not. In one example, the UE 210 may evaluate if the traffic redirection is acceptable or not based on local settings as well as other factors. In the case that the UE 210 decides to accept the network slice handover request, before terminating the connection with the network slice 2, the UE 210 may need to initiate (S208) a connection establishment process to the network slice 1 via a non-access stratum (NAS) signaling process. Related bearers or tunnels to convey application layer traffic can be established during the process. Specifically, the UE 210 may send, in step S209, a connection establishment request message via the RAN 220 to the control plane function node 230-1 of the network slice 1. The connection establishment request message may include information indicative of slice ID/slice type of the network slice 1.

In step S210, once the connection with the network slice 1 is established, the UE 210 redirects specific user traffic from the network slice 2 to the network slice 1 as requested.

Through bearers established between the UE 210 and the network slice 1, the UE 210 may send, in step S211, a service request (such as an HTTP request) to the user plane function node 240-1 of the network slice 1, which forwards, in step S212, the received service request to the AF 270.

The AF 270 replies the application layer response message in step S213, and then the requested service can be provided to the UE 210.

In step S214, the UE 210 replies the control plane function node 230-2 of the dedicated network slice 2 with a network slice handover response message to confirm if the specific user traffic has been successfully redirected from the network slice 2 to the network slice 1.

Based on the response message from the UE 210, the control plane function node 230-2 of the network slice 2 sends, in step S215, a redirecting user traffic response message to the OSS/BSS 260 to report if the required user traffic has been successfully redirected to the network slice 1. If the network slice handover procedure is related to redirection of the traffic of several UEs, the control plane function node 230-2 of the network slice 2 may decide to send the redirecting user traffic response message based on the response messages from all those UEs related to the network slice handover procedure.

In the cloud-based network, the OSS/BSS 260 may interact with a NFVO 250 to terminate, in step S216, the network slice 2, i.e., terminating the specific virtual network service and releasing related cloud infrastructure resource for the network slice 2.

Figure 3:
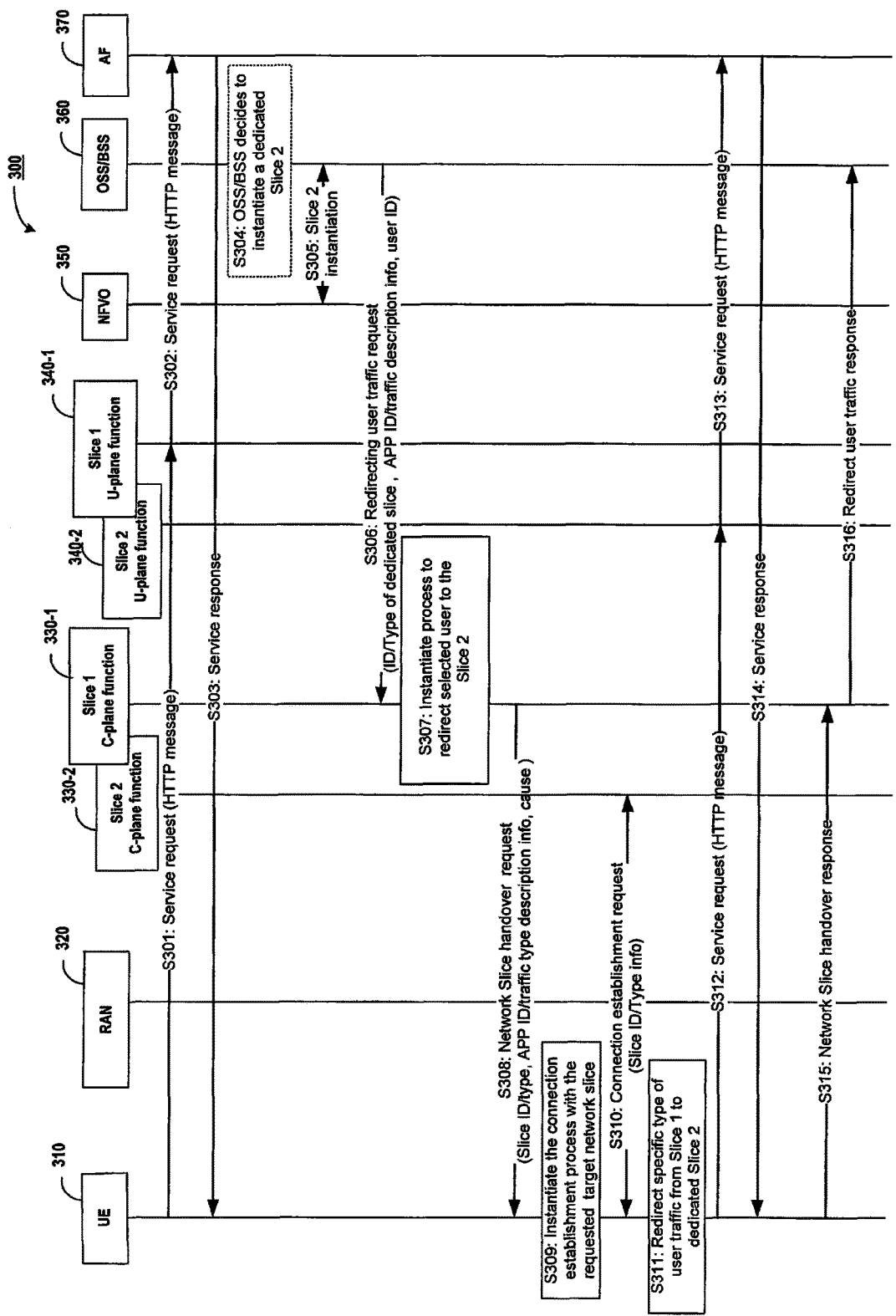
FIG. 3 is a flow diagram schematically illustrating a process 300 of redistribution of traffic between different network slices according to another of the present disclosure.

FIG. 3 is an interactive message flow diagram schematically illustrating a process 300 of redistribution of traffic between different network slices according to another of the present disclosure, where traffic is redirected to a newly-instantiated dedicated network slice from a default network slice.

The example process 300 of FIG. 3 can be performed in the communication network as described in details with reference to FIG. 2. Here is omitted the similar description for the purpose of conciseness.

Assume a UE 310 is originally served for a particular service (s) by a network slice 1, which may be a default network slice in the network. Through the bearers over the network slice 1, the UE 310 may send, in step S301, an application layer service request such as a HTTP request to require certain information from the application server or report certain information to the application server hosting the application functions. The service request message is received and processed by a user plane function node of the network slice 1 (as denoted by numeral reference 340-1), which then forwards, in step S302, the service request message to a relevant application function (AF) node 370. In step S303, the AF 270 replies the UE 310 with an application layer response message to provide required service.

According to the example embodiment of FIG. 3, based on analysis result from user requirement/behavior, or operator business strategy, and/or requirement from service providers, the OSS/BSS 360 may determine whether to instantiate a dedicated network slice to serve the increasing special user requirement, especially when the user requirement is significant e.g., the special user requirement (may be represented by user group size, or traffic volume, etc.) exceeds certain threshold.

If the OSS/BSS 360 decides, in step S304, to instantiate a specific dedicated network slice 2, it interacts, in step S305, with a NFVO 350 to allocate necessary cloud infrastructure resource and deploy the specific virtual network service over cloud resource so that the dedicated network slice 2 can be instantiated.

After the dedicated network slice 2 is successfully instantiated, the OSS/BSS 360 needs to inform the default network slice 1 to redirect specific user traffic to the dedicated network slice 2 such that the network slice handover makes no effects to the user traffic of the UE 210. In step S306, the OSS/BSS 360 sends a redirecting user traffic request message to a control plane function node 330-1 of the default network slice 1. The redirecting user traffic request message may include information that is necessary to perform the traffic redirection between the default network slice 1 and the newly-instantiated network slice 2. As an example, the redirecting user traffic request may include, but not limited to, at least one of following items:

user identification information of the at least user equipment;
information related to the target dedicated network slice, such as slice ID and/or slice type;
descriptive information of the traffic to be redirected, such as traffic type, cause of the redirection.

Based on the redirecting user traffic request message from the OSS/BSS 360, the control plane function node 330-1 of the network slice 1 may optionally instantiate, in step S307, a dedicated process to redirect related UEs between the network slice 2 and the network slice 1. In step S308, the control plane function node 330-1 of the network slice 1 sends a network slice handover request message to the UE 310 that is identified in the redirecting user traffic request sent by the OSS/BSS 360. It should be appreciated that one or more UEs may be involved in the network slice handover procedure, although FIG. 3 only shows one the UE 310 for the purpose of illustration. The network slice handover request message may include, but not limited to:

information related to the network slice 2, e.g., the network slice type and/or network slice ID of the target network slice 2;
Descriptive information of the traffic to be redirected, e.g., the type of the traffic, cause of the redirection.

It should be noted depending upon the architecture of the network, in the case of the PCRF is the interaction function with the OSS/BSS 360, the PCRF as the control plane function instead of the MME itself may trigger the user traffic redirection process through the MME.

In response to the network slice handover request message from network side, the UE 310 may decide if the request can be accepted or not. For example, the UE 310 may evaluate if the traffic redirection is acceptable or not based on local settings as well as other factors.

In the case that the UE 310 decides to accept the network slice handover request, the UE 210 needs to initiate (S309) a connection establishment process to the requested target network slice 2 via a non-access stratum (NAS) signaling process. Related bearers or tunnels to convey application layer traffic can be established during the process. Specifically, the UE 310 may send, in step S310, a connection establishment request message via the RAN 320 to the control plane function node 330-2 of the target dedicated network slice 2. The connection establishment request message may include information indicative of slice ID/slice type of the network slice 2.

In step S311, once the connection with the dedicated network slice 2 is established, the UE 310 redirects specific user traffic from the default network slice 1 to the dedicated network slice 2 as requested.

Through bearers or tunnels established between the UE 310 and the dedicated network slice 2, the UE 310 may send, in step S312, a service request (such as a HTTP request) to the user plane function node 340-2 of the network slice 2, which forwards, in step S313, the received service request to the AF 370.

The AF 370 replies the application layer response message in step S314, and then the requested service can be provided to the UE 310.

In S315, the UE 310 replies the control plane function node 330-1 of the default network slice 1 with a network slice handover response message to confirm if the specific user traffic has been successfully redirected from the network slice 1 to the network slice 2.

Based on the response message from the UE 310, the control plane function node 330-1 of the network slice 1 sends, in step S316, a redirecting user traffic response message to the OSS/BSS 360 to report if the required user traffic has been successfully redirected to the network slice 2. If the network slice handover procedure is related to redirection of the traffic of several UEs, the control plane function node 330-1 of the network slice 1 may decide to send the redirecting user traffic response message based on the response messages from all those UEs related to the network slice handover procedure.

Figure 4:
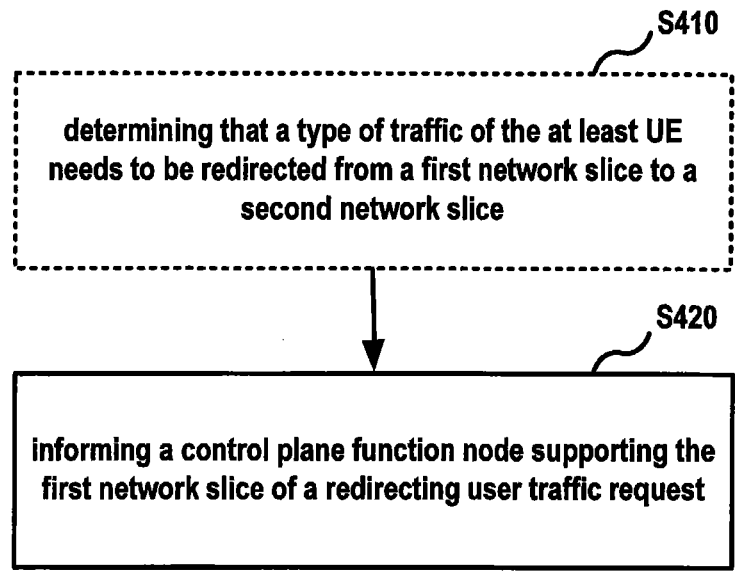
FIG. 4 is a diagram schematically illustrating a method 400 performed by a network node according to one or more embodiments of the present disclosure.

FIG. 4 is a diagram schematically illustrating a method 400 performed by a network node in a network comprising a plurality of network slices according to one or more embodiments of the present disclosure.

As illustrated in FIG. 4, the network node informs, at block S420, a control plane function node supporting a first network slice of a redirecting user traffic request. The block S420 may occur in response to determination (as illustrated in block S410) that user traffic of at least one user equipment needs to be redirected from the first network slice to a second network slice. The at least one user equipment may be currently attached to the first network slice and obtain the requested services from the first network slice. Compared with the first network slice, the second network slice in the network handles a control plane and/or user plane for communication services in a different way from the first network slice.

According to one or more embodiments of the present disclosure, the control plane function node supporting a first network slice may be a MME or a PCRF node of the network, which provides relevant functions to support the first network slice.

In an embodiment, the redirecting user traffic request sent from the network node to the control plane function node of the first slice may include at least one of following items: user identification information of the at least one user equipment; information related to the second network slice; and/or descriptive information of the traffic to be redirected.

According to one or more embodiments of the present disclosure, the network node controlling the traffic redirection between network slices may be an OSS/BSS node of the operator. Since a great amount of user information (e.g., user traffic information, user requirement or behavior information) as well as operator strategy is naturally available for the OSS/BSS system, the OSS/BSS node may be enhanced to make the determination of traffic redirection. In some example embodiments, the OSS/BSS node may determine that a type of traffic of the at least one user equipment needs to be redirected from the first network slice to the second network slice, if it is determined that the first network slice originally bearing the type of traffic is to be terminated. In further example embodiments, the OSS/BSS node may determine that a type of traffic of the at least one user equipment needs to be redirected from the first network slice to the second network slice, if it is determined that the second network slice is to be instantiated to bearing the type of traffic.

It should be understood that there only provide, by way of example, some scenarios where the traffic redirection may occur. The user traffic redirection from one network slice to another network slice may also be triggered under other appropriate conditions. The network node such as the OSS/BSS node may maintain operator-specific policies to manage redistribution of the user traffic among different network slices in flexible and dynamic way.

Figure 5:
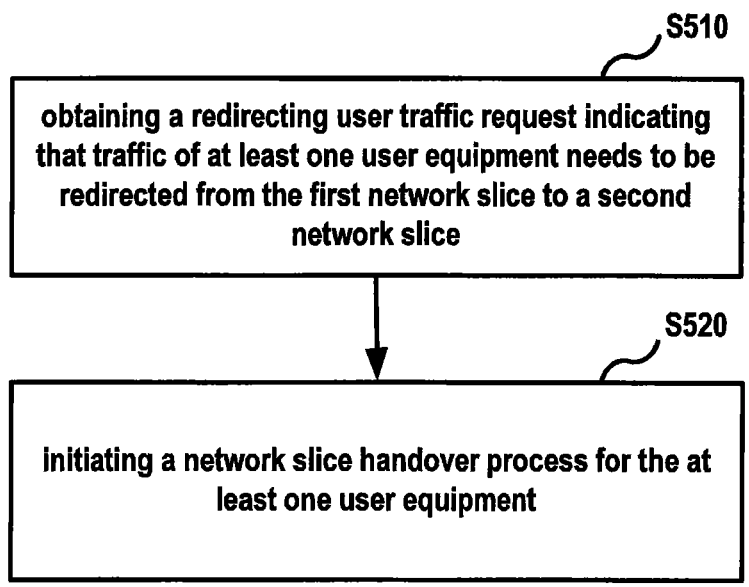
FIG. 5 is a diagram schematically illustrating a method 500 performed by a control plane function node according to an embodiment of the present disclosure.

FIG. 5 is a diagram schematically illustrating a method 500 performed by a control plane function node in a network comprising a plurality of network slices according to an embodiment of the present disclosure. The control plane function node supports a first network slice so as to serve at least one user equipment.

As illustrated in FIG. 5, the method 500 enters block S510, where the control plane function node of the first network slice obtains a redirecting user traffic request indicating that traffic of at least one user equipment needs to be redirected from the first network slice to a second network slice. In some embodiments, the control plane function node may receive the redirecting user traffic request from the OSS/BSS node of the operator. In response to the redirecting user traffic request message, the control plane function node of the first network slice initiates, at block 520, a network slice handover process for the at least one user equipment, which is identified in the request message. Compared with the first network slice, the second network slice in the network handles a control plane and/or user plane for communication services in a different way from the first network slice.

According to one or more embodiments of the present disclosure, initiating a network slice handover process for the at least user equipment may comprise sending a network slice handover request message from the control plane function node of the first network slice to the at least one user equipment. In some embodiment, the network slice handover request message may include at least one of information related to the second network slice; and/or descriptive information of the traffic to be redirected.

In some embodiments of the present disclosure, the control plane function node may be a MME or a PCRF node of the network.

Figure 6:
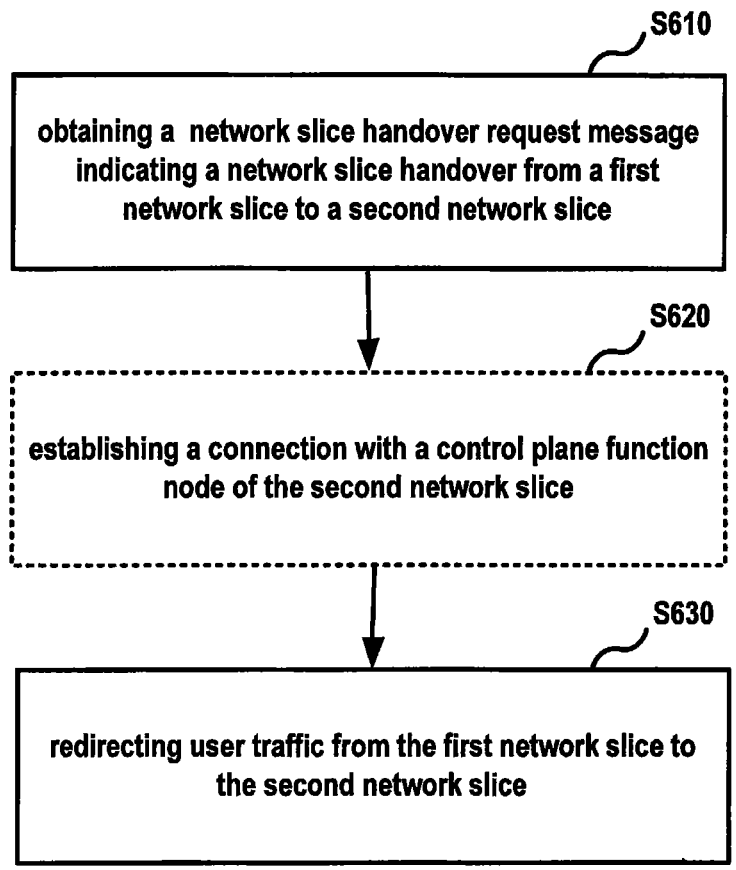
FIG. 6 is a diagram schematically illustrating a method 600 performed by a UE according to an embodiment of the present disclosure.

FIG. 6 is a diagram schematically illustrating a method 600 performed by a UE in a network comprising a plurality of network slices according to an embodiment of the present disclosure. The UE currently attaches to a first network slice to obtain required communication services.

As illustrated in FIG. 6, the method 600 enters block S610, where the UE obtains a network slice handover request message indicating a network slice handover from the first network slice to a second network slice. In response to the network slice handover request message, the UE redirects, at block S630, user traffic from the first network slice to the second network slice as requested. Compared with the first network slice, the second network slice in the network handles a control plane and/or user plane for communication services in a different way from the first network slice.

In some embodiments where the UE has no connection with the second network slice, before redirecting the user traffic, the UE may establish, at block S620, a connection with a control plane function node that supports the target second network slice. In some embodiments of the present disclosure, the control plane function node may be a MME or a PCRF node of the network.

In some embodiment, the network slice handover request message received by the UE may include at least one of: information related to the second network slice; and/or descriptive information of the traffic to be redirected.

Figure 7:
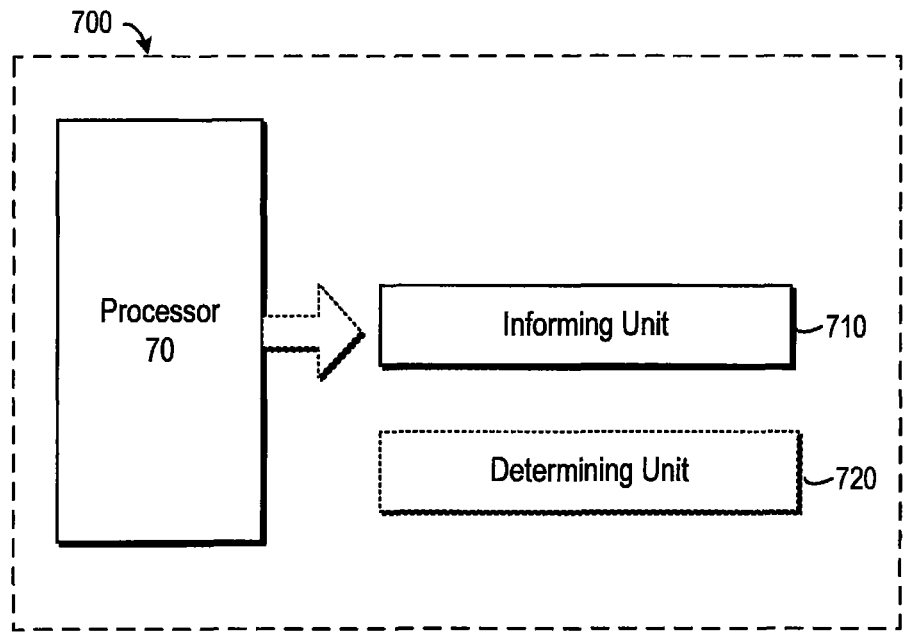
FIG. 7 is a block diagram schematically illustrating a network node 700 according to an embodiment of the present disclosure.

FIG. 7 is a block diagram schematically illustrating a network node 700 in a network comprising a plurality of network slices according to an embodiment of the present disclosure.

The network node 700 comprises a processor 70, which may include one or more microprocessor or microcontrollers, as well as other digital hardware, which may include digital signal processors (DSPs), special-purpose digital logic, and the like. The processor 70 may be configured to execute program code stored in memory (not shown in FIG. 7), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 70 may be used to cause functional units comprised in the network node 700 to perform corresponding functions according one or more embodiments of the present disclosure.

Particularly, the network node 700 comprises an informing unit 710. The informing unit 710 is configured to inform a control plane function node supporting a first network slice of a redirecting user traffic request, in response to determination that user traffic of at least one user equipment needs to be redirected from the first network slice to a second network slice.

In one or more embodiments of the present disclosure, the network node 700 may be an OSS/BSS node of the operator. Since a great amount of user information (e.g., user traffic information, user requirement or behavior information) as well as operator strategy is naturally available for the OSS/BSS system, the OSS/BSS node may be enhanced to make the determination of traffic redirection. In some embodiments, the control plane function node supporting the first network slice may be a MME, or a PCRF node.

According to some embodiments, the network node 700 may obtain the determination result from other network node in the network, while in some other embodiments, for example, where the network node 700 is the OSS/BSS node of the operator, the network node 700 may comprise a determining unit 720, which may conduct the determination on whether to redirect user traffic from one network slice to another.

According to one or more embodiments, the determining unit 720 may be configured to determine that a type of traffic of the at least one user equipment needs to be redirected from the first network slice to the second network slice, if it is determined that the second network slice is to be instantiated to bearing the type of traffic. Alternatively or additionally, the determining unit 720 may be configured to determine that a type of traffic of the at least one user equipment needs to be redirected from the first network slice to the second network slice, if it is determined that the first network slice originally bearing the type of traffic is to be terminated.

According to one or more embodiments of the present disclosure, the redirecting user traffic request sent by the network node 700 may include at least one of the following items: user identification information of the at least one user equipment; information related to the second network slice; and/or descriptive information of the traffic to be redirected.

Figure 8:
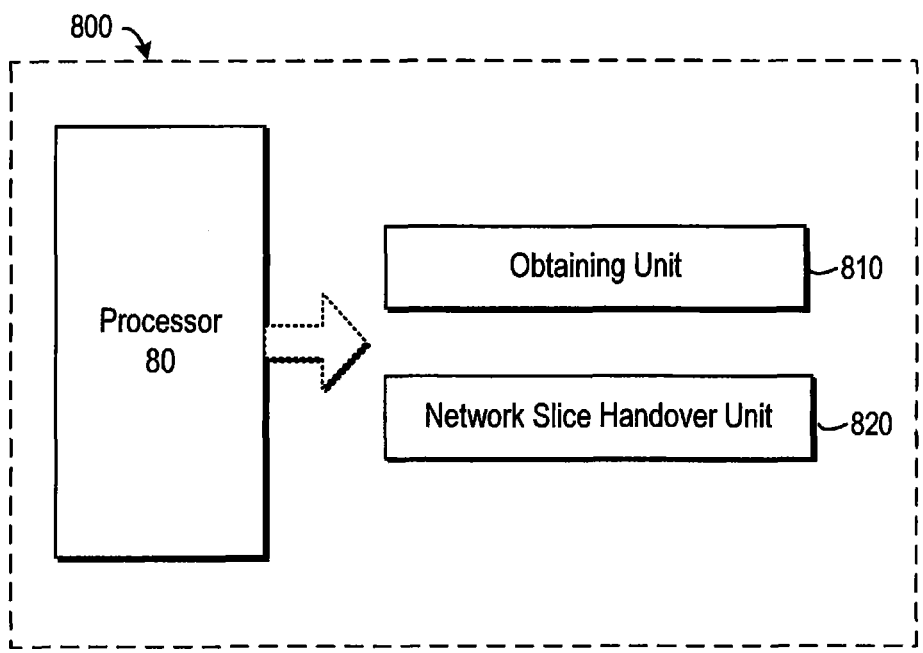
FIG. 8 is a block diagram schematically illustrating a control plane function node 800 according to an embodiment of the present disclosure.

FIG. 8 is a block diagram schematically illustrating a control plane function node 800 in a network comprising a plurality of network slices according to an embodiment of the present disclosure.

The control plane function node 800 comprises a processor 80, which may include one or more microprocessor or microcontrollers, as well as other digital hardware, which may include digital signal processors (DSPs), special-purpose digital logic, and the like. The processor 80 may be configured to execute program code stored in memory (not shown in FIG. 8), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 80 may be used to cause functional units comprised in the control plane function node 800 to perform corresponding functions according one or more embodiments of the present disclosure.

Particularly, the control plane function node 800 comprises an obtaining unit 810 and a network slice handover unit 820. In the case that the control plane function node 800 currently supports a first network slice, the obtaining unit 810 is possible to obtain a redirecting user traffic request indicating that traffic of at least one user equipment needs to be redirected from the first network slice to a second network slice. In some embodiments, the redirecting user traffic request may include at least one of: user identification information of the at least one user equipment; information related to the second network slice; and/or descriptive information of the traffic to be redirected.

In response to the redirecting user traffic request message, the network slice handover unit 820 is configured to initiate a network slice handover process for the at least one user equipment. Compared with the first network slice, the second network slice in the network handles a control plane and/or user plane for communication services in a different way from the first network slice.

According to one or more embodiments of the present disclosure, the network slice handover unit 820 is configured to send a network slice handover request message to the at least one user equipment, which is involved in the network slice handover process. The network slice handover request message may include at least one of the following items: information related to the second network slice; and/or descriptive information of the traffic to be redirected.

In one or more embodiments of the present disclosure, the control plane function node 800 may be a MME or a PCRF node, which may provide relevant functions to support the first network slice.

Figure 9:
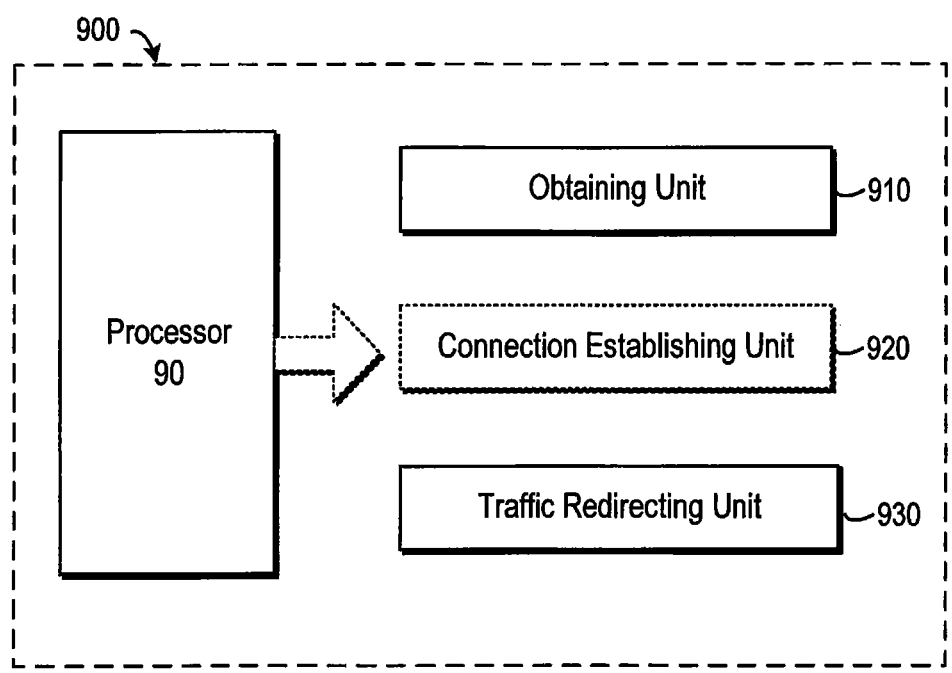
FIG. 9 is a diagram schematically illustrating a UE 900 according to one or more embodiments of the present disclosure.

FIG. 9 is a diagram schematically illustrating a UE 900 according to one or more embodiments of the present disclosure.

The UE 900 comprises a processor 90, which may include one or more microprocessor or microcontrollers, as well as other digital hardware, which may include digital signal processors (DSPs), special-purpose digital logic, and the like. The processor 90 may be configured to execute program code stored in memory (not shown in FIG. 9), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 90 may be used to cause functional units comprised in the UE 900 to perform corresponding functions according one or more embodiments of the present disclosure.

Particularly, the UE 900 comprises an obtaining unit 910, a traffic redirecting unit 930, and optionally a connection establishing unit 920.

The UE 900 may currently attaches to a first network slice to obtain required communication services. The obtaining unit 910 is configured to obtain a network slice handover request message indicating a network slice handover from the first network slice to the second network slice. In response to the network slice handover request message, the traffic redirecting unit 930 is configured to redirect user traffic from the first network slice to the second network slice in response to the network slice handover request message obtained by the obtaining unit 910. Compared with the first network slice, the second network slice in the network handles a control plane and/or user plane for communication services in a different way from the first network slice.

In some embodiments where the UE has no connection with the second network slice, before redirecting the user traffic, the connection establishing unit 920 may be configured to establish a connection with a control plane function node that supports the target second network slice. In some embodiments of the present disclosure, the control plane function node may be a MME or a PCRF node of the network.

In some embodiment, the network slice handover request message obtained by the obtaining unit 910 may include at least one of the following items: information related to the second network slice; and/or descriptive information of the traffic to be redirected.

The various embodiments of the present disclosure provide effective solutions for network operator to redistribute user traffic between different network slices in a flexible and dynamic way. Those embodiments intend to reduce service interruption time to user during traffic redirection between network slices so as to ensure user experience during the traffic redirection phase. Furthermore, it can be seen from the above description, the solutions for user traffic redistribution may be built on the enhancement in existing network interfaces and network functions, which is practical and feasible from implementation perspective. In particular, some embodiments allow the OSS/BSS of the operator to dynamically instantiate or terminate a dedicated network slice based on dynamic user requirements to realize agile business model.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method performed by a network node, comprising:
    informing, in response to a determination that user traffic of at least one user equipment needs to be redirected from a first network slice to a second network slice, a control plane function node supporting the first network slice of a redirecting user traffic request, wherein the redirecting user traffic request is sent from the network node to the control plane function node, wherein the redirecting user traffic request comprises user identification information of the at least one user equipment, information related to the second network slice, and descriptive information of the traffic to be redirected,
    wherein the first network slice comprises a first set of network functions in a first configuration to handle at least one of a control plane and a user plane for communication services in the first network slice, and the second network slice comprises a second set of network functions in a second configuration to handle at least one of a control plane and a user plane for communication services in the second network slice, wherein the second configuration is different from the first configuration.

2. The method according to claim 1, wherein the network node is an Operation Support System, OSS, node and/or Business Support System, BSS, node.

3. The method according to claim 1, further comprising:
    determining that a type of traffic of the at least one user equipment needs to be redirected from the first network slice to the second network slice, responsive to determining that the first network slice originally bearing the type of traffic is to be terminated.

4. The method according to claim 1, further comprising:
    determining that a type of traffic of the at least one user equipment needs to be redirected from the first network slice to the second network slice, responsive to determining that the second network slice is to be instantiated to bear the type of traffic.

5. The method according to claim 1, wherein the control plane function node supporting the first network slice is a Mobility Management Entity, MME, or a Policy and Charging Rules Function, PCRF, node.

6. A method performed by a control plane function node, the control plane function node supporting at least a first network slice, the method comprising:
    obtaining a redirecting user traffic request indicating that traffic of at least one user equipment needs to be redirected from the first network slice to a second network slice; and
    initiating a network slice handover process for the at least one user equipment based on the redirecting user traffic request obtained by the control plane function node, wherein initiating a network slice handover process for the at least one user equipment comprises:
        sending a network slice handover request message to the at least one user equipment, wherein the network slice handover request message is configured to cause the at least one user equipment to determine whether to redirect a type of traffic from the first network slice to the second network slice as requested in the redirecting user traffic request or not redirect the type of traffic from the first network slice to the second network slice, wherein the determination is based on local settings of the at least one user equipment, and wherein the network slice handover request message comprises:

information related to the second network slice; and
descriptive information of the traffic to be redirected,
wherein the first network slice comprises a first set of network functions in a first configuration to handle at least one of a control plane and a user plane for communication services in the first network slice, and the second network slice comprises a second set of network functions in a second configuration to handle at least one of a control plane and a user plane for communication services in the second network slice, wherein the second configuration is different from the first configuration.

7. The method according to claim 6, wherein the control plane function node is a Mobility Management Entity, MME, or a Policy and Charging Rules Function, PCRF, node.

8. A method performed by a user equipment, comprising:
obtaining a network slice handover request message indicating a network slice handover from a first network slice to a second network slice, wherein the network slice handover request message comprises information related to the second network slice and descriptive information of traffic to be redirected;
determining, based on acceptable local settings of the user equipment, to redirect a type of traffic from the first network slice to the second network slice as requested in the network slice handover request message; and
redirecting user traffic from the first network slice to the second network slice,
wherein the first network slice comprises a first set of network functions in a first configuration to handle at least one of a control plane and a user plane for communication services in the first network slice, and the second network slice comprises a second set of network functions in a second configuration to handle at least one of a control plane and a user plane for communication services in the second network slice, wherein the second configuration is different from the first configuration.

9. The method according to claim 8, further comprising: establishing a connection with a control plane function node supporting the second network slice.

10. The method according to claim 8, wherein the control plane function node supporting the second network slice is a Mobility Management Entity, MME, or a Policy and Charging Rules Function, PCRF, node.

11. A network node comprising:
a processor; and
a memory comprising processor-executable instructions that, when executed by the processor, cause the processor to:
inform, in response to a determination that user traffic of at least one user equipment needs to be redirected from a first network slice to a second network slice, a control plane function node supporting the first network slice of a redirecting user traffic request, wherein the redirecting user traffic request is sent from the network node to the control plane function node, wherein the redirecting user traffic request comprises user identification information of the at least one user equipment, information related to the second network slice, and descriptive information of the traffic to be redirected,
wherein the first network slice comprises a first set of network functions in a first configuration to handle at least one of a control plane and a user plane for communication services in the first network slice, and the second network slice comprises a second set of network functions in a second configuration to handle at least one of a control plane and a user plane for communication services in the second network slice, wherein the second configuration is different from the first configuration.

12. The network node according to claim 11, wherein the network node is an Operation Support System, OSS, node and/or Business Support System, BSS, node.

13. The network node according to claim 11, wherein the memory further comprises processor-executable instructions that, when executed by the processor, cause the processor to:
determine that a type of traffic of the at least one user equipment needs to be redirected from the first network slice to the second network slice, responsive to determining that the second network slice is to be instantiated to bear the type of traffic.

14. The network node according to claim 11, wherein the memory further comprises processor-executable instructions that, when executed by the processor, cause the processor to:
determine that a type of traffic of the at least one user equipment needs to be redirected from the first network slice to the second network slice, responsive to determining that the first network slice originally bearing the type of traffic is to be terminated.

15. The network node according to claim 11, wherein the control plane function node supporting the first network slice is a Mobility Management Entity, MME, or a Policy and Charging Rules Function, PCRF, node.

16. The method according to claim 1, wherein the redirecting user traffic request is configured to generate a network slice handover request message configured to cause the at least one user equipment to determine whether to redirect a type of traffic from the first network slice to the second network slice as requested in the redirecting user traffic request or not redirect the type of traffic from the first network slice to the second network slice.

17. The network node according to claim 11, wherein the redirecting user traffic request is configured to generate a network slice handover request message configured to cause the at least one user equipment to determine whether to redirect a type of traffic from the first network slice to the second network slice as requested in the redirecting user traffic request or not redirect the type of traffic from the first network slice to the second network slice.

* * * * *